Nov. 17, 1942.   J. H. BOWEN   2,302,175
PRESSURE REGULATOR
Filed Jan. 31, 1941
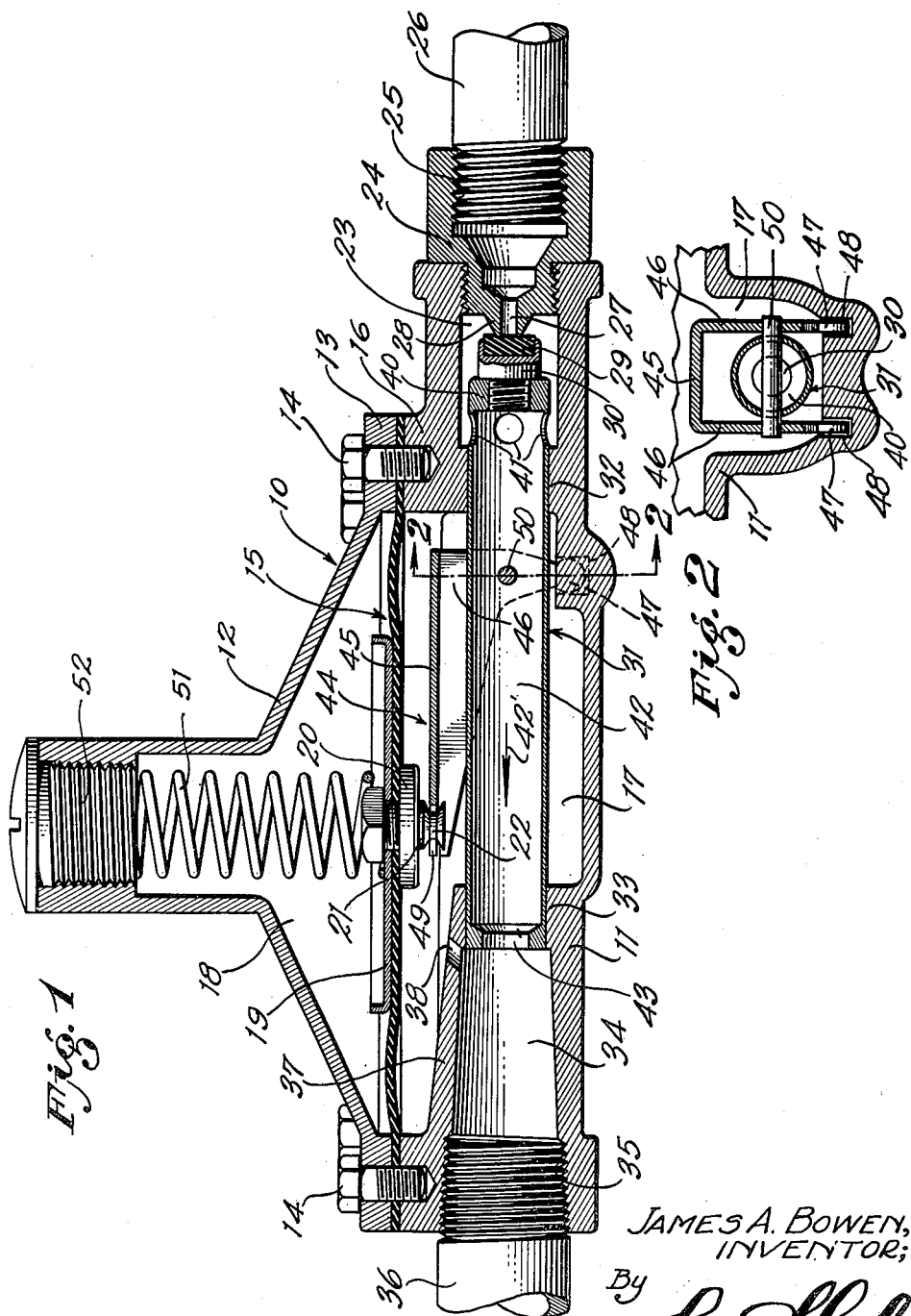
James A. Bowen,
INVENTOR;
By
ATTORNEY.

Patented Nov. 17, 1942

2,302,175

UNITED STATES PATENT OFFICE 2,302,175

PRESSURE REGULATOR

James H. Bowen, Indianapolis, Ind., assignor to Leonard C. Roney, Los Angeles, Calif.

Application January 31, 1941, Serial No. 376,834

2 Claims. (Cl. 50—26)

My invention relates to pressure regulating valves, and relates in particular to a pressure regulator having a special utility in gas systems fed from metal storage containers wherein the internal pressure gradually decreases as the gas is used from the container.

In gas systems of the type referred to in the foregoing, it has been found that when a new tank is connected to the system, an ample flow of gas will be obtained for the reason that the inlet pressure of the gas fed to the pressure regulator is sufficient to produce the required flow of gas through the inlet orifice of the valve and the space between the valve seat and the closure, but when the tank pressure becomes depleted to a low value, for example, around fifty or sixty pounds per square inch, the control valve of the ordinary type many times will not open sufficiently to give the volumetric flow of gas necessary for suitable operation of burners fed by the gas system.

It is an object of the present invention to provide a pressure regulator of the character described which will give an ample flow of gas from the storage tank and through the system even at relatively low pressures.

It is a further object of the invention to provide a regulator having parts so arranged that the valve opening action is assisted by a venturi within the device resulting from a flow of gas through certain parts thereof when fuel is being drawn from the supply system.

It is a further object of the invention to provide a regulator wherein the movement of the gas relative to movable parts of the device likewise assists in the valve operating action.

A further object is to provide in a regulator means which will assist through use of differential pressure the recovery of the control of pressure by the spring pressed diaphragm.

A further object is to provide a pressure regulator having a valve seat and a closure element carried by a support having a passage extended within this support, which is in turn movably mounted in the valve body.

Further objects and advantages of the invention will be brought out in the following part of the specification.

Referring to the drawing which is for illustrative purposes only:

Fig. 1 is a sectional view of a preferred embodiment of my invention.

Fig. 2 is a cross section taken as indicated in the line 2—2 of Fig. 1.

Referring to Fig. 1 of the drawing, the embodiment of the invention includes a hollow body 10 comprising a base 11 and a bonnet 12 having an annular flange 13 through which screws 14 pass to secure the bonnet 12 to the base 11. A flexible diaphragm 15, in accordance with customary practice, has its periphery clamped between the flange 13 of the bonnet 12 and the annular wall portion 16 of the base 11.

The diaphragm 15 provides a yieldable partition wall between the interior space 17 of the base 11 and the interior space 18 of the bonnet 12, and is centrally reinforced by a circular plate 19, clamped in place by a screw fitting 20 having a downwardly projecting body or pin 21 with an annular groove 22 therein. The base 11 has a threaded inlet opening 23 to receive an inlet valve plug 24 which is in turn threaded at 25 for connecting with a pressure pipe 26 leading from the source of gas under pressure, or container, not shown.

The inlet valve plug 24 has an inlet orifice 27, which passes co-axially through a valve seat 28. A closure element 29 is supported in a screw 30 carried at the front end of a movable valve member 31. This movable valve member 31 comprises a tube disposed in axial alignment with the inlet valve orifice 27, and is supported by an annular guide wall 32, formed in the base 11 in spaced relation to the inlet valve seat 28, and by an annular or circular guide wall 33 disposed so as to engage the member 31 at or near the rear end thereof. These guide walls 32 and 33 form cylindric openings which are a relatively close fit around the body of the member 31.

The rear guide 33 communicates directly with a discharge opening 34 having threads 35 for engagement with the threaded end of outlet piping 36. The discharge passage or opening 34 is separated from the interior space 17 of the base 11 by a wall 37 having an opening 38 which slopes upwardly and rightwardly, as shown.

The front end of the member 31 is closed by a wall 40 and the screw 30 which supports the closure member 29. Lateral openings 41 are formed in the wall of the member 31 adjacent the front end wall 40 thereof to communicate with the inlet opening or passage 23 ahead of, or to the right of the guide wall 32. The interior space or passage 42 of the member 31 extends from the openings 41 to an opening 43 of decreased diameter relative to the passage 42, so that as gas passes leftward as indicated by the arrow 42', its velocity will be increased as it leaves the leftward end of the passage 42, whereby the gas will pass leftwardly into and through the outlet passage 34 with a jet action which will have a Venturi effect in conection with the diagonally disposed opening 38 to create a suction or reduced pressure adjacent the lower face of the diaphragm 15 under conditions which will be later referred to.

Operative connection between the diaphragm 15 and the movable valve member 31 is accomplished by a fulcrum lever 44 formed from a metal plate so as to provide an upper substantially horizontal wall 45 having webs 46 extending down from the longitudinal edges thereof. The rightward ends of the downwardly extending webs 46 are formed so as to provide cylindric toes 47 which engage pockets 48 formed in the bottom wall of the base 11. The front, or leftward end of the top wall 45 has a notch 49 for coengagement with the annular channel 22 of the fitting 20 associated with the diaphragm 15, whereby vertical movement of the central portion of the diaphragm 15 will be transmitted to the leftward end of the fulcrum lever 44. The rightward portion of this fulcrum lever 44 is connected to the movable valve member by means of a transverse pin 50 which is disposed in a vertical plane passing through the cylindric toes 47, this vertical plane being indicated by the line 2—2 of Fig. 1. Vertical movement of the leftward end of the lever 44 will cause the same to rock on or about the cylindric toes 47 which engage the pockets 48, thereby causing a lateral movement of the pin 50 and of the movable valve member 31. Accordingly, as the pressure of gas within the space 17 of the base 11 increases, the diaphragm and its associated parts will be raised against the action of an adjusting spring 51 which is retained by a plug 52 threaded into the upper portion of the bonnet 12. This upward movement of the diaphragm will be transmitted to the leftward end of the fulcrum lever 44, causing the same to rock rightward on the pivot means formed by the cylindric toes 47, thereby carrying the movable valve member 31 rightward so as to force the closure element 29 against the seat 28 of the inlet valve.

When no gas is being taken through the outlet piping 36, the pressures in the space or chamber 17 and the inlet and outlet openings 23 and 34 will be equalized, and the closure element 29 will be held against the seat 28. The cooperation of parts in the regulator is such that when a valve associated with the outlet piping 36 is opened so as to cause a reduction in pressure in the outlet passage 34, there will be a sequence of effects which will occur almost instantaneously and will result in the movement of the movable valve member 31 leftward to such extent as to move the closure element 29 an appreciable distance away from the mouth of the orifice 27. For example, with the valve in static closed condition as shown in Fig. 1, a reduction in pressure in the outlet space 34 will result in a pressure differential acting leftward against the rightward end of the member 31, while at the same time there will be a flow from the upper portion of the space 17 through the opening 38 into the outlet opening 34 to permit a downward movement of the diaphragm 15 and its associated parts. This will result in an initial opening movement of the member 31 as the downward movement of the diaphragm permits an anti-clockwise rotation of the fulcrum lever 44. It will be noted that there is a relatively loose coengagement of the notch 49 and the channel 22 so as to permit a free action of the inner-engaging parts. Consequently there is a degree of play between the pin 21 and the leftward end of the lever 44. Assuming that the pressure in the inlet orifice 27 of the valve is relatively low, and that it were necessary to depend upon downward movement of the fitting 20 to transmit movement to the lever 44 and the member 31 to move the same leftward, the downward movement of the central portion of the diaphragm and the member 20 would have to be great enough to take up the slack between the pin 21 and the leftward end of the lever and the slack between the toes 47 and the pockets 48, before the lever could transmit a leftward movement to the valve member 31. In the arrangement shown the pressure differential acting against the valve member 31 when a reduction in pressure occurs in the outlet passage 34, urges the valve member 31 leftward to whatever extent the downward movement of the fitting 20 will permit. The opening of the orifice 27 will then permit a flow of gas leftward through the passage 42 of the member 31 and thence through the outlet passage 34. This flow of gas past the opening 38 will by Venturi effect produce a pressure reduction in the space 17 so as to rapidly reduce the pressure therein and permit a maximum drop in the diaphragm under pressure of the spring 51 so that the fulcrum lever 44 will be rocked to the left through a maximum distance. The effects referred to in the foregoing apparently occur almost simultaneously. However, the result obtained is that a wide opening of the closure element 29 relative to the valve seat 28 is obtained so that the flow of gas through the orifice 27 at low pressure is not restricted by the closure element 29 lying in close relation to the seat 28. A study of the operation of the device leads toward the conclusion that the pressure differential effective in the regulator when an initial pressure reduction occurs in the pipe 36, produces a leftward movement of the valve initially greater than the pressure drop in the piping 38 and in the outlet space 34 would seem to warrant, and then as the pressure within the space or chamber 17 is recovered to normal value, there may be a small rightward movement of the member 31, but this rightward movement will not be sufficent to restrict the flow through the inlet orifice 27 to such extent as to prevent a normal flow of gas through the regulator and the piping 36, even though the pressure in the container connected with the inlet fitting 24 has dropped to a low range of values.

I claim as my invention:

1. A pressure regulator having in combination with a hollow body with an inlet valve seat, wall means forming an outlet passage aligned with said inlet valve seat and a diaphragm: a movable valve member comprising a tube aligned for cooperation with said valve seat and having at the front end thereof a transverse wall to close the end of the tube and support a closure element to engage said valve seat; guide means in said body at the inner end of said outlet passage supporting said valve members so that it can be moved toward and away from said valve seat, the rear end of said tube extending through said guide means into said outlet passage and being in open communication with said outlet passage, said valve member having a gas passage extending therein from a point near said valve seat to communication with said outlet passage; and means operatively connecting said diaphragm and said valve member, said wall means in said body having therein an opening having one end thereof exposed to the flow of gas in said outlet passage and the other end thereof communicating with space in said body contiguous to said diaphragm.

2. In a pressure regulator having a hollow body with aligned inlet and outlet passages, an inlet valve seat in the outer portion of said inlet passage; a diaphragm and associated valve operating means, the combination of: walls in said body forming guide openings at the inner ends of said inlet and outlet passages; a movable valve member comprising a tube disposed with its front end projecting through one of said guide openings into said inlet passage and having the rear end thereof extending within the other of said guide openings; the front end of said tube having a transverse wall to lie in confronting relation to said inlet valve seat and a lateral opening to communicate with said inlet passage, and the rear end of said tube being in open communication with said outlet passage; and means to connect said valve operating means with said movable valve member.

JAMES H. BOWEN.